(12) United States Patent
Wang et al.

(10) Patent No.: US 12,113,241 B2
(45) Date of Patent: Oct. 8, 2024

(54) BATTERY MODULE

(71) Applicant: CONTEMPORARY AMPEREX TECHNOLOGY (HONG KONG) LIMITED, Hong Kong (CN)

(72) Inventors: Zhichao Wang, Ningde (CN); Peng Wang, Ningde (CN)

(73) Assignee: CONTEMPORARY AMPEREX TECHNOLOGY (HONG KONG) LIMITED, Hong Kong (CN)

(*) Notice: Subject to any disclaimer, the term of this patent is extended or adjusted under 35 U.S.C. 154(b) by 532 days.

(21) Appl. No.: 17/469,985

(22) Filed: Sep. 9, 2021

(65) Prior Publication Data
US 2021/0408642 A1 Dec. 30, 2021

Related U.S. Application Data

(63) Continuation of application No. PCT/CN2020/104705, filed on Jul. 26, 2020.

(30) Foreign Application Priority Data

Aug. 20, 2019 (CN) .......................... 201921353800.6

(51) Int. Cl.
*H01M 50/503* (2021.01)
*H01M 50/211* (2021.01)
(Continued)

(52) U.S. Cl.
CPC ....... *H01M 50/503* (2021.01); *H01M 50/211* (2021.01); *H01M 50/507* (2021.01); *H01M 50/548* (2021.01); *H01M 2220/20* (2013.01)

(58) Field of Classification Search
CPC ............ H01M 50/503; H01M 50/548; H01M 50/211; H01M 50/507
(Continued)

(56) References Cited

U.S. PATENT DOCUMENTS

2011/0159340 A1* 6/2011 Hu ...................... H01M 10/617
429/120
2016/0248062 A1* 8/2016 Lee ....................... H01M 50/24
(Continued)

FOREIGN PATENT DOCUMENTS

CN 105244467 A 1/2016
CN 105514498 A 4/2016
(Continued)

OTHER PUBLICATIONS

International Search Report dated Oct. 28, 2020 issued in PCT/CN2020/104705.

*Primary Examiner* — James M Erwin
*Assistant Examiner* — John S Medley
(74) *Attorney, Agent, or Firm* — Scully, Scott, Murphy & Presser, P.C.

(57) ABSTRACT

A battery module, including: a plurality of battery cell units arranged along a width direction, where each of the battery cell units has a tab, and the tab is arranged on at least one end of the battery cell unit along a length direction; and a first harness plate arranged on at least one end of the battery module along the length direction, where the first harness plate has a plurality of through grooves, and the tab passes through and is arranged on the through groove; and the through groove has an opening along a height direction, and the tab is configured to pass through and be arranged on the through groove through the opening.

17 Claims, 5 Drawing Sheets

(51) Int. Cl.
*H01M 50/507* (2021.01)
*H01M 50/548* (2021.01)

(58) Field of Classification Search
USPC .......................................................... 429/159
See application file for complete search history.

(56) References Cited

U.S. PATENT DOCUMENTS

| | | | |
|---|---|---|---|
| 2018/0315977 A1 | 11/2018 | Park et al. | |
| 2019/0326582 A1* | 10/2019 | Berels | B60K 1/04 |
| 2019/0386283 A1* | 12/2019 | Lee | B23K 26/60 |
| 2020/0189156 A1* | 6/2020 | Ma | B29C 45/14655 |

FOREIGN PATENT DOCUMENTS

| | | | | |
|---|---|---|---|---|
| CN | 206697544 U | * | 12/2017 | ......... H01M 50/507 |
| CN | 206992212 U | * | 2/2018 | ......... H01M 10/058 |
| CN | 207518008 U | | 6/2018 | |
| CN | 209150210 U | | 7/2019 | |
| CN | 210006810 U | | 1/2020 | |
| KR | 20150110078 A | | 10/2015 | |

* cited by examiner

BATTERY MODULE

This application is a continuation of International Application No. PCT/CN2020/104705, filed on Jul. 26, 2020, which claims priority to Chinese Patent Application No. 201921353800.6, filed with the Chinese Patent Office on Aug. 20, 2019 and entitled "BATTERY MODULE", which is incorporated herein by reference in its entirety.

TECHNICAL FIELD

This application relates to the field of battery module technologies, and in particular, to a battery module.

BACKGROUND

A harness plate is mainly used to carry electrical connectors (such as aluminum bars) and sampling harnesses, so that tabs of a battery cell unit (including positive tabs and negative tabs) are connected in series and parallel through the electrical connectors of the harness plate.

Generally, the harness plate is in an integral structure, and the tabs of the battery cell unit need to penetrate holes of the harness plate to be connected to the electrical connectors. However, due to features of relatively soft, deformable, and assembly tolerance of a soft-packed battery cell, it is difficult to ensure that tabs of a plurality of battery cell units can penetrate the holes of the harness plate at the same time.

Therefore, there is an urgent need for a battery module to resolve the problem mentioned above.

SUMMARY

The embodiments of this application provide a battery module to resolve the problem that a tab of a battery cell unit is not easy to be assembled with a harness plate.

The embodiments of this application provide a battery module, including:

a plurality of battery cell units arranged along a width direction, where each of the battery cell units has a tab, and the tab is arranged on at least one end of the battery cell unit along a length direction; and a first harness plate arranged on at least one end of the battery module along the length direction, where the first harness plate has a plurality of through grooves, and the tab passes through and is arranged on the through groove; and the through groove has an opening along a height direction, and the tab is configured to pass through and be arranged on the through groove through the opening.

Optionally, the battery module further includes a second harness plate connected to the first harness plate, where the second harness plate is arranged above or below the first harness plate along the height direction.

Optionally, the first harness plate further has a plurality of installation parts, each of the installation parts has the through grooves on both sides along the width direction; each of the installation parts is provided with an electrical connector, and the tab is connected to the electrical connector.

Optionally, the battery module further includes a second harness plate connected to the first harness plate, where the second harness plate has a plurality of through grooves; and the through groove on the second harness plate is arranged correspondingly to the through groove on the first harness plate.

Optionally, the first harness plate and the second harness plate each has a plurality of installation parts, each of the installation parts has the through grooves on both sides along the width direction; each of the installation parts is provided with an electrical connector, and the tab is connected to the electrical connector.

Optionally, the electrical connector and the first harness plate or the second harness plate provided with the installation part are integrally formed through injection molding.

Optionally, the first harness plate or the second harness plate provided with the installation part has a first surface facing away from the battery cell unit, and the electrical connector has a second surface facing away from the battery cell unit; and the second surface does not exceed the first surface along the length direction.

Optionally, an isolation part is arranged between the two installation parts, and each of the isolation parts has a protrusion; and the through groove is arranged between the installation part and the isolation part.

Optionally, an installation structure is arranged between the first harness plate and the second harness plate.

Optionally, both ends of the opening are provided with guide structures along the width direction.

The technical solutions provided in the embodiments of this application have the following beneficial effects:

In the battery module provided in the embodiments of this application, the through groove of the first harness plate has an opening along the height direction (Z), so that the tab can pass through and be arranged on the through groove through the opening. Thus, by changing an assembling direction of the harness plate (namely, assembling in a direction perpendicular to an extension direction of the tab), the problem that the tab of the battery cell unit is not easy to be assembled with the harness plate is resolved.

It should be understood that the general description above and the following details are only exemplary and cannot limit this application.

REFERENCE SIGNS

M—battery module;
1—battery cell unit;
11—tab;
2—harness plate;
21—first harness plate;

210—first surface;
211—through groove;
211a—opening;
211b—guide structure;
212—installation part;
212a—electrical connector;
212a1—second surface;
213—isolation part;
213a—protrusion;
22—second harness plate;
23—installation structure;
231—buckle;
232—buttonhole;
233—pin;
234—pin hole;
X—length direction;
Y—width direction;
Z—height direction;
I—installation direction.

The drawings herein are incorporated into the specification and constitute a part of the specification, showing embodiments that conform to this application, and are used with the specification to explain principles of this application.

DESCRIPTION OF EMBODIMENTS

To make objectives, technical solutions, and advantages of this application clearer, the following further describes this application in detail with reference to the accompanying drawings and embodiments. It should be understood that the specific embodiments described herein are only used to explain this application, and are not used to limit this application.

In the description of this application, unless expressly stipulated and limited otherwise, terms "first" and "second" are only used for descriptive purposes, and cannot be understood as indicating or implying relative importance; unless otherwise stipulated or stated, the term "a plurality of" refers to two or more; terms "connected", "fixed", and the like should be understood in a broad sense. For example, "connected" may be a fixed connection, a detachable connection, or an integral connection, or electrical connection; it may be directly connected or indirectly connected through an intermediate medium. For those skilled in the art, the specific meaning of the above terms in the present application can be understood according to the specific circumstances.

In the description of this specification, it should be understood that the noun of locality such as "upper" and "lower" described in the embodiments of this application are described from the angle shown in the accompanying drawings, and should not be understood as a limitation to the embodiments of this application. In addition, in the context, it should also be understood that when referring to that an element is connected "on" or "under" another element, it can not only be directly connected "on" or "under" another element, but also be indirectly connected "on" or "under" another element through an intermediate element.

Figure 1:
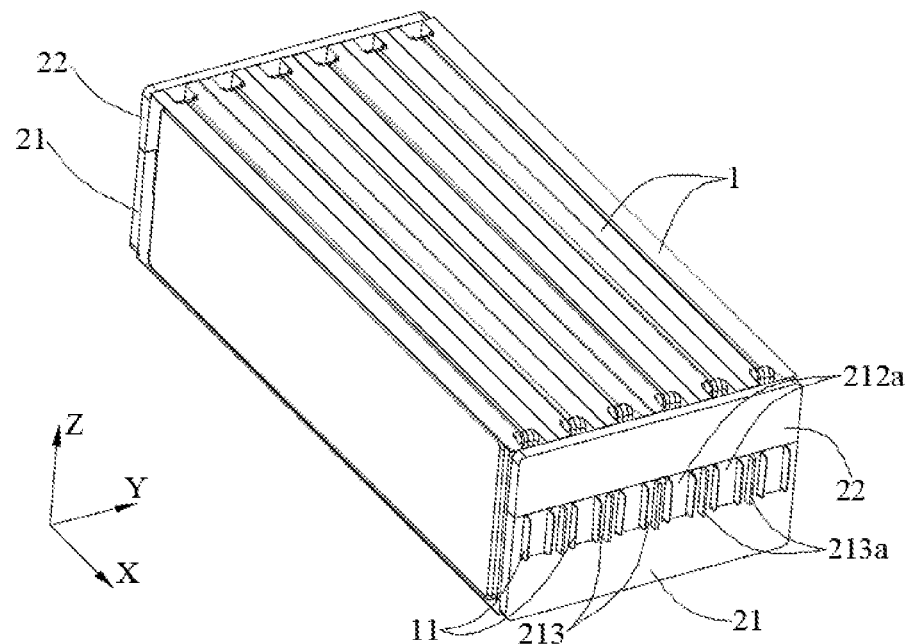
FIG. 1 is a schematic structural diagram of a battery module according to an embodiment of this application.
Figure 2:
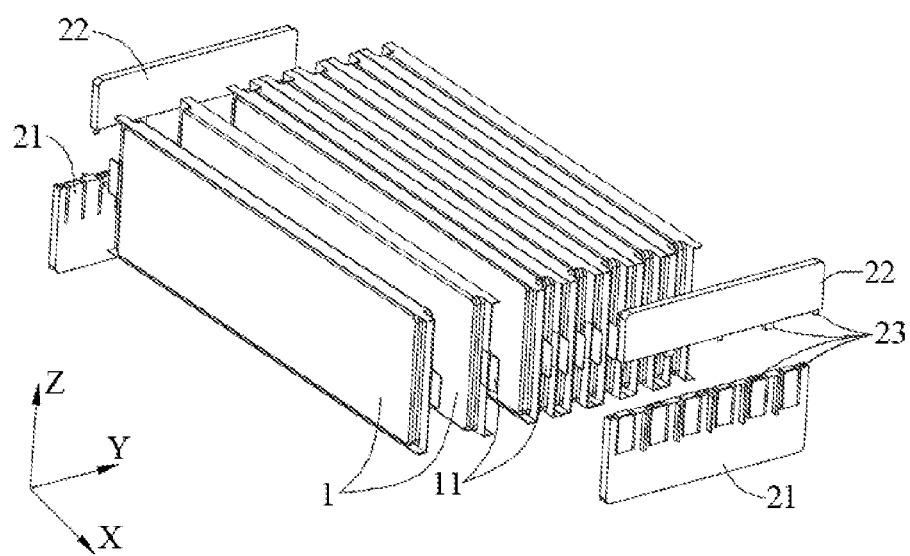
FIG. 2 is a schematic exploded view of a battery module according to an embodiment of this application.
Figure 3:
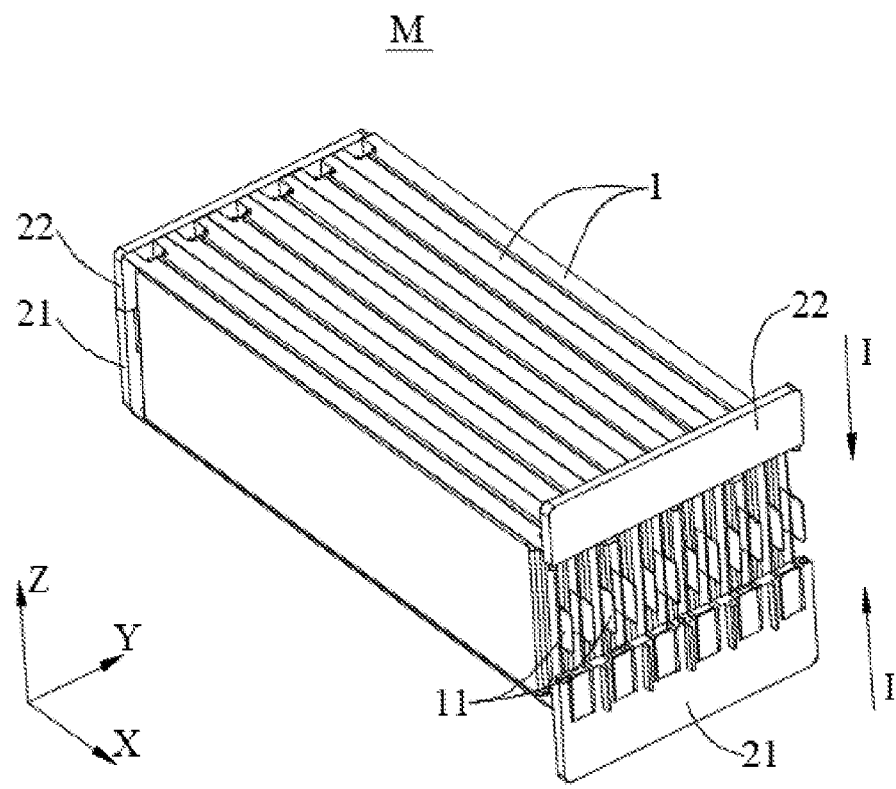
FIG. 3 is a schematic structural diagram of a battery module during harness plate assembly according to an embodiment of this application.
Figure 4:
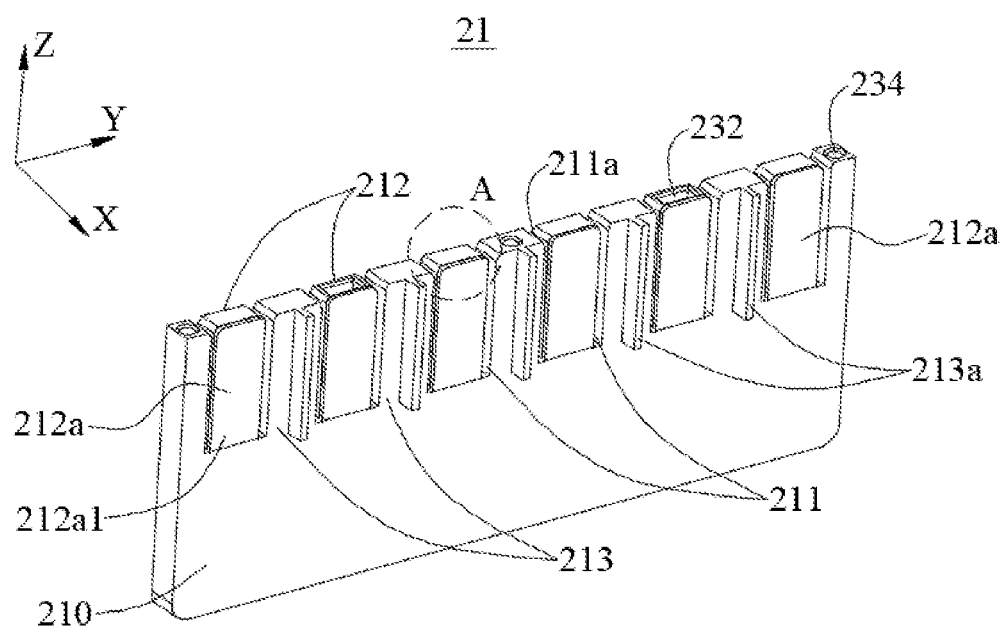
FIG. 4 is a schematic structural diagram of a first harness plate of a battery module in FIG. 1 according to an embodiment of this application.
Figure 5:
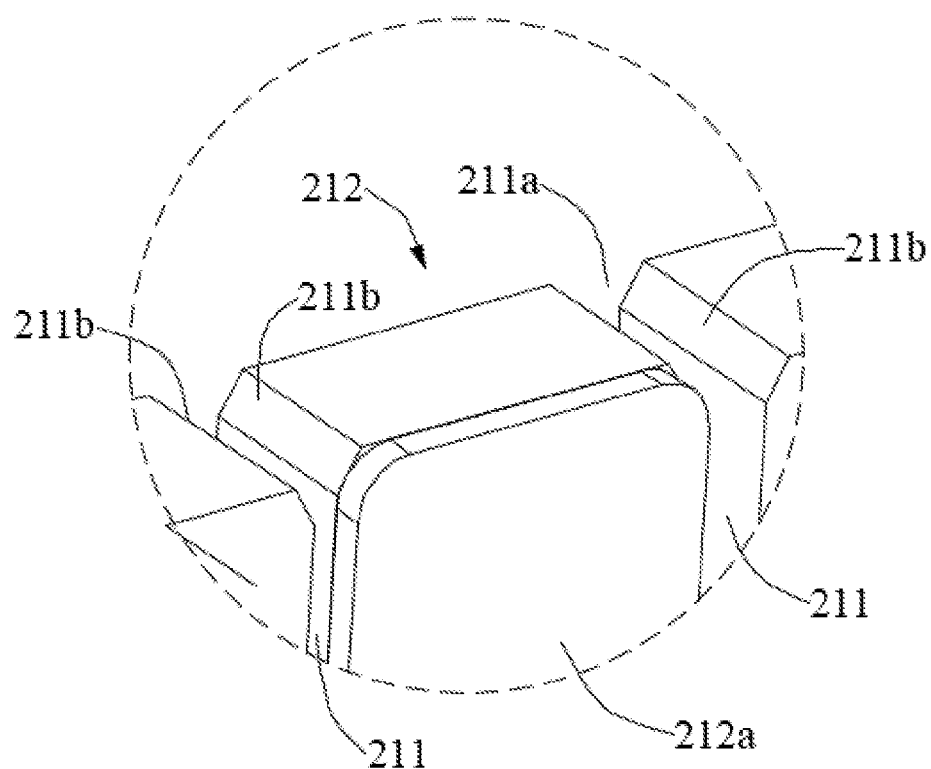
FIG. 5 is an enlarged schematic diagram of A in FIG. 4.
Figure 6:
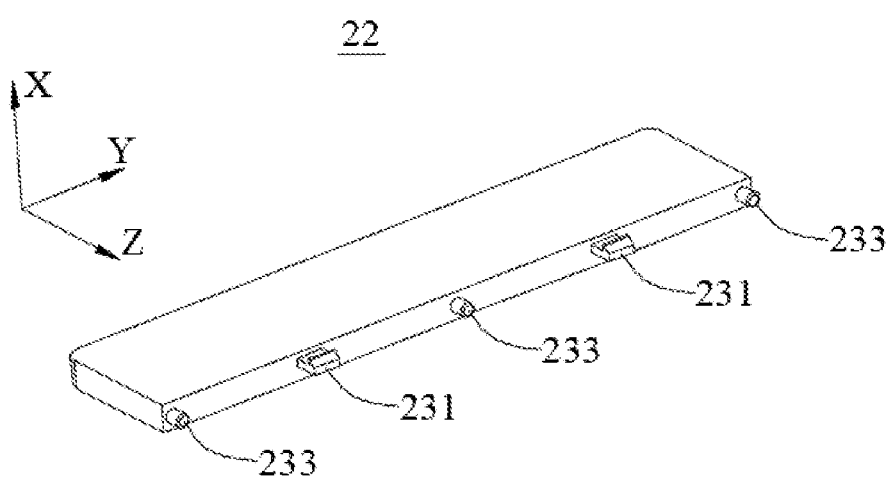
FIG. 6 is a schematic structural diagram of a second harness plate of a battery module in FIG. 1 according to an embodiment of this application.
Figure 7:
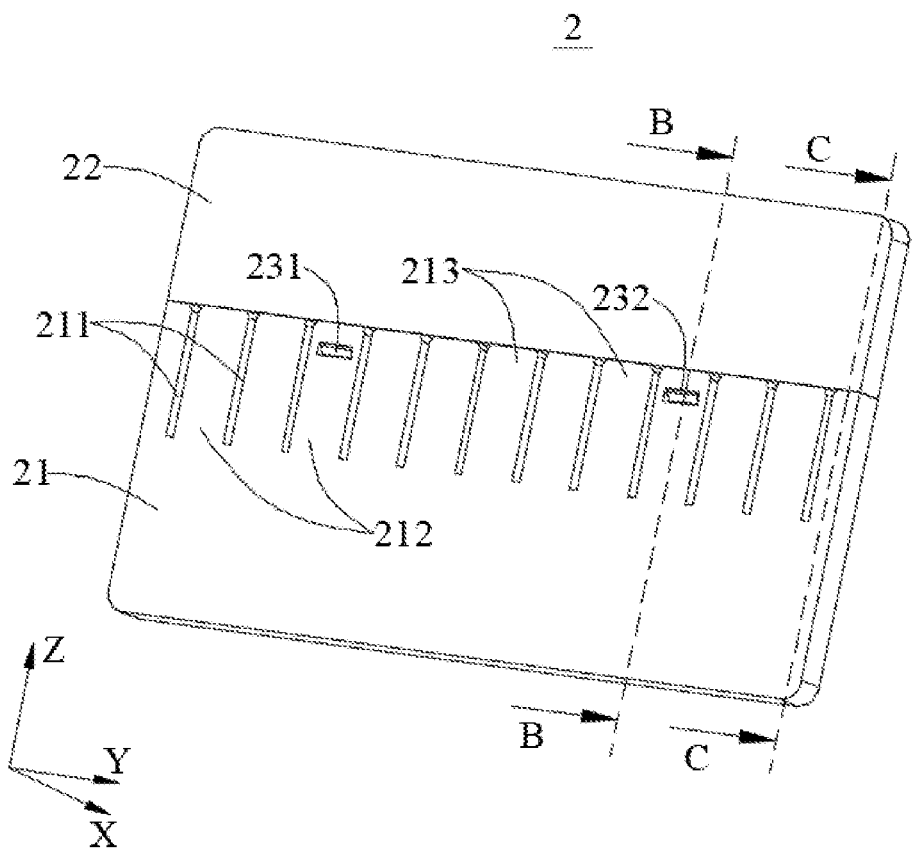
FIG. 7 is a schematic structural diagram of a harness plate of a battery module in FIG. 1 according to an embodiment of this application.
Figure 8:
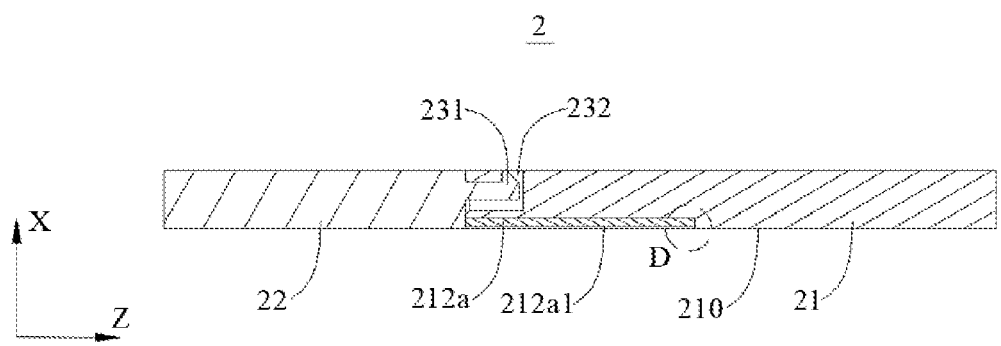
FIG. 8 is a schematic sectional view of B-B in FIG. 7.
Figure 10:
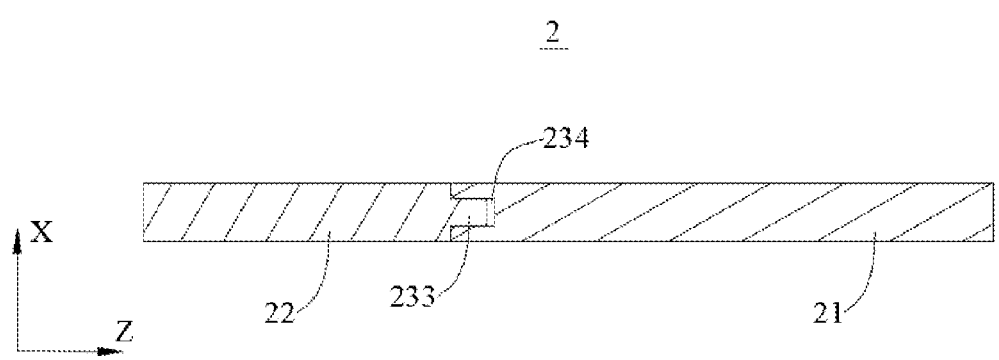
FIG. 10 is a schematic sectional view of C-C in FIG. 7.

FIG. 1 is a schematic structural diagram of a battery module according to this application; FIG. 2 is a schematic exploded view of a battery module according to this application; FIG. 3 is a schematic structural diagram of a battery module during harness plate assembly according to this application; FIG. 4 is a schematic structural diagram of a first harness plate of a battery module in FIG. 1; FIG. 5 is an enlarged schematic diagram of A in FIG. 4; FIG. 6 is a schematic structural diagram of a second harness plate of a battery module in FIG. 1; FIG. 7 is a schematic structural diagram of a harness plate of a battery module in FIG. 1; FIG. 8 is a schematic sectional view of B-B in FIG. 7; and FIG. 10 is a schematic sectional view of C-C in FIG. 7.

As shown in FIG. 1 to FIG. 3, the battery module M may be used as a power source for an electric apparatus (for example, an electric vehicle). The battery module M includes a plurality of battery cell units 1 and first harness plates 21, where:

a plurality of battery cell units 1 are arranged along a width direction (Y), each battery cell unit 1 has a tab 11, and the tab 11 is arranged on at least one end of the battery cell unit 1 along a length direction (X); a first harness plate 21 is arranged on at least one end of the battery module along the length direction (X), the first harness plate 21 has a plurality of through grooves 211, and the tab 11 can pass through the through groove 211. Tabs 11 are respectively bent to electrical connectors 212a (details are described later) according to the need of serial and parallel connection, and then are electrically connected to the electrical connectors 212a on the first harness plate 21 through welding (for example, laser welding). The electrical connector 212a is connected to an external device (such as a measuring device or other electrical devices) through a harness, to sample an internal working state of the battery module M or provide electrical energy for the external device.

The tab 11 includes a positive tab or a negative tab. The tab 11 extends out of a main body of the battery cell unit 1, and the number of the first harness plates 21 depends on arrangement of the tab 11. For example, when a pair of tabs 11 of the battery cell unit 1 is on one of the ends, a first harness plate 21 may be provided on the end (two or more harness plates may also be provided, for example, the second harness plate 22 may also be provided, details are described later); when the pair of tabs 11 of the battery cell unit 1 are respectively located on both ends of the battery cell unit 1 along the length direction (X), a first harness plate 21 may be respectively provided on each end (similarly, two or more harness plates may also be provided on each end, for example, the second harness plate 22 may also be provided, details are described later), that is, the battery module M has at least two first harness plates 21.

It may be understood that the battery cell unit 1 provided in this application not only includes a battery cell, for example, it may also include a thermal conductive sheet and a heat resisting sheet (not shown in the figure). The thermal conductive sheet is located between the battery cell and the heat resisting sheet. Optionally, the thermal conductive sheet is punched out of a high thermal conductivity metal sheet such as red copper or pure aluminum, and the heat resisting sheet is made of heat insulating and fireproof material. A large surface of the battery cell is attached to the thermal conductive sheet, and a thermal conductive glue may be applied between the battery cell and the thermal conductive sheet to ensure a sufficient thermal conduction contact area. The other side of the thermal conductive sheet is fixedly connected with the heat resisting sheet. In a combination of a set of arranged battery cell units 1, a battery cell of a next battery cell unit 1 is bonded to a heat resisting sheet of a previous battery cell unit 1. In this way, heat of each battery cell can only be conducted through a contacting thermal conductive sheet in the set of battery cell units 1; moreover, there must be a heat resisting sheet between thermal conductive sheets of adjacent battery cell units 1, which avoids heat transfer between different battery cells due to thermal insulation of the heat resisting sheet, thereby effectively avoiding heat diffusion between the battery cells of adjacent battery cell units 1.

Please refer to FIG. 4 and FIG. 5, the through groove 211 has an opening 211a along a height direction (Z), and the tab 11 can pass through and be arranged on the through groove 211 through the opening 211a. The through groove 211 of the first harness plate 21 provided in this application has an opening 211a along the height direction (Z), so that the tab 11 can pass through and be arranged on the through groove 211 through the opening 211a. Thus, by changing an assembling direction of the harness plate (namely, assembling in a direction perpendicular to an extension direction of the tab 11), the problem that the tab of the battery cell unit is not easy to be assembled with the harness plate is resolved.

In other words, in related technologies, the harness plate is assembled with the tab in parallel along the extension direction of the tab. Because the tab is relatively soft and easily deformed, when the battery module has a plurality of battery cell units, it becomes very difficult to smoothly insert all the tabs into holes of the harness plate. However, in the embodiment provided in this application, the assembly direction of the first harness plate 21 and the tab 11 is changed, namely, assembling in a direction perpendicular to the extension direction of the tab 11. For example, an installation direction (I) may be from bottom to top or from top to bottom (please refer to FIG. 3), which may improve assembly efficiency and a success rate of the tab and the harness plate.

Specifically, the foregoing battery module further includes a second harness plate 22 connected to the first harness plate 21, where the second harness plate 22 is arranged above or below the first harness plate 21 along the height direction (Z). Optionally, the embodiment provided in this application is; the installation direction (I) of the first harness plate 21 is from bottom to top, and the second harness plate 22 is arranged above the first harness plate 21 along the height direction (Z). In other words, the second harness plate 22 may be optionally arranged above or below the first harness plate 21 along the height direction (Z) according to an actual extension position of the tab 11, and optionally, the installation direction (I) of the first harness plate 21 and the second harness plate 22 may also be from bottom to top or from top to bottom.

It should be noted that the first harness plate 21 and the second harness plate 22 may be collectively referred to as a harness plate 2.

It may be understood that when the tab 11 is arranged on the end of the battery cell unit 1 along the height direction (Z), there may be only one first harness plate 21, and the through groove 211 is arranged on the end of the first harness plate 21 along the height direction (Z), so that the first harness plate 21 can be smoothly assemble with the tab 11.

It may be further understood that there may be two or more harness plates. For example, besides the first harness plate 21, there may be the second harness plate 22 connected to the first harness plate 21, and there may also be a third harness plate, a fourth harness plate (not shown in the figure), and the like connected to the first harness plate 21 or the second harness plate 22. This application is mainly about two harness plates (namely, the first harness plate 21 and the second harness plate 22).

In one case, the second harness plate 22 at least serves a purpose of being separately assemble with the first harness plate 21, namely, the through groove 211 is not arranged on the second harness plate 22 (as shown in FIG. 6). In other words, after the tab 11 passes through the through groove 211 of the first harness plate 21, the second harness plate 22 blocks the opening 211a of the through groove 211, so that the tab 11 is more stably housed in the through groove 211. This is also a main advantage of separate assembly of the first harness plate 21 and the second harness plate 22.

In this case, the first harness plate 21 further has a plurality of installation parts 212, each installation part 212 has through grooves 211 on both sides along the width direction (Y); each installation part 212 is provided with an electrical connector 212a, and the tab 11 is connected to the electrical connector 212a. Optionally, the first harness plate 21 may be made of a plastic part with high structural strength and high dielectric strength, and the electrical connector 212a may be made of a highly conductive metal such as red copper or pure aluminum, which is used for welding with the tab 11 of the battery cell unit 1, for example, laser welding.

In another case, the second harness plate 22 also has a plurality of through grooves 211 (a through groove 211 on the second harness plate 22 is not shown in the figure), and the through groove 211 on the second harness plate 22 is arranged correspondingly to the through groove 211 on the first harness plate 21. When the tab 11 is arranged on one of the ends of the battery cell unit 1 along the length direction (X), the positive tab and the negative tab are arranged up and down along the height direction (Z), so that the positive tab and the negative tab may be assembled by separately passing through the through grooves 211 on the first harness plate 21 and the second harness plate 22. Alternatively, when the tabs 11 are arranged on both ends of the battery cell unit 1 along the length direction (X), a height of the tab 11 along the height direction (Z) exceeds a depth of the through groove 211 on the first harness plate 21 along the height direction (Z), so that after the tab 11 passes through the through groove 211 on the first harness plate 21, a part of the tab 11 may be exposed in an opening direction of the through groove 211. Therefore, a plurality of through grooves 211 arranged correspondingly to the through groove 211 on the first harness plate 21 are continued to be arranged on the second harness plate 22, so that the exposed part of the tab 11 can be housed.

In this case, the first harness plate 21 and the second harness plate 22 each have a plurality of installation parts 212 (the installation parts 212 on the second harness plate 22 are not shown in the figure), and each installation part 212 has through grooves 211 on both sides along the width direction (Y); each installation part 212 is provided with an electrical connector 212a, and the tab 11 is connected to the electrical connector 212a. Optionally, both the first harness plate 21 and the second harness plate 22 may be made of a plastic part with high structural strength and high dielectric strength, and the electrical connector 212a may be made of a highly conductive metal such as red copper or pure aluminum, which is used for welding with the tab 11 of the battery cell unit 1, for example, laser welding.

It should be noted that when the tabs 11 are arranged on both ends of the battery cell unit 1 along the length direction (X), optionally, one of the first harness plate 21 and the second harness plate 22 has a plurality of through grooves 211. The other is arranged on one side of the opening 211a, namely, keeping the opening 211a at a middle position of the battery cell unit 1 along the height direction (Z) as much as possible. In other words, the first harness plate 21 and the second harness plate 22 are molded in a separate manner. In this way, on the basis of improving the assembly efficiency of the tab 11, the first harness plate 21 may conform to a commonly used battery cell unit 1 on the market to a greater extent, namely, the position of the tab 11 is roughly in the middle of the battery cell unit 1.

Optionally, the electrical connector 212a and the first harness plate 21 or the second harness plate 22 provided with the installation part 212 are integrally formed through injection molding. In this embodiment, the electrical connector 212a and the first harness plate 21 are integrally formed through injection molding. It may be understood that the electrical connector 212a may also be embedded in the installation part 212 after injection molding of the first harness plate 21. Of course, integral injection molding of the electrical connector 212a and the first harness plate 21 may certainly greatly improve a molding efficiency of the first harness plate 21.

Figure 9:
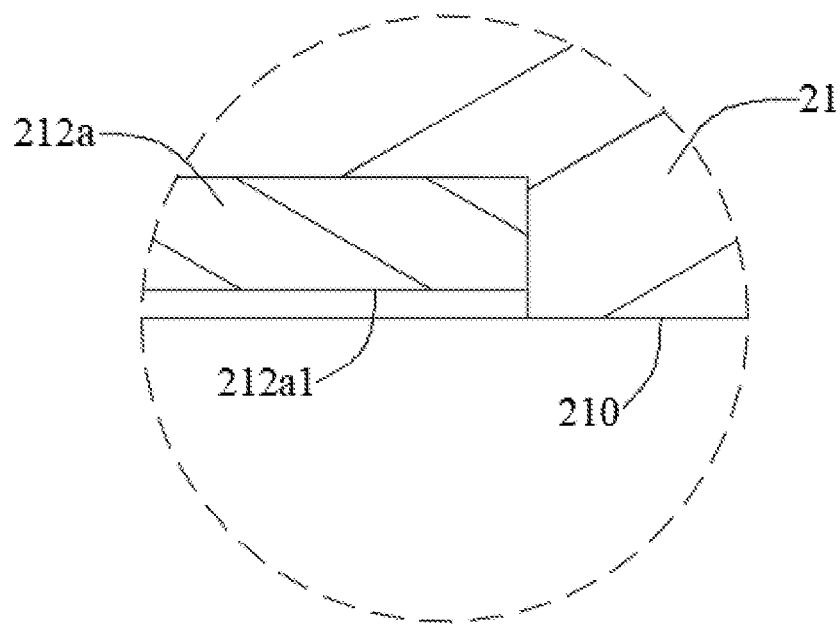
FIG. 9 is an enlarged schematic diagram of D in FIG. 8.

Please refer to FIG. 8 and FIG. 9, the electrical connector 212a is arranged on one side of the installation part 212 facing away from the battery cell unit 1, and the first harness plate 21 or the second harness plate 22 provided with the installation part 212 has a first surface 210 facing away from the battery cell unit 1, the electrical connector 212a has a second surface 212a1 facing away from the battery cell unit 1, and along the length direction (X), the second surface 212a1 does not exceed the first surface 210. In this way, when the tab 11 is bent and welded to the electrical connector 212a, it is ensured that the tab 11 will not exceed the first surface 210 to the greatest extent, thereby protecting the tab 11 and improving installation compactness of the tab 11 and the first harness plate 21.

It should be noted that, taking a pair of tabs 11 respectively on both ends of the battery cell unit 1 as an example, the positive tab is made of a first material, and the negative tab is made of a second material. The first material and the second material are both metals, and tabs are made of different materials to avoid electrochemical corrosion. However, dissimilar metals are much more difficult to weld. Therefore, a first material foil is provided on the surface of one of the tabs as a welding surface, for example, on the surface of the negative tab, so that the negative tab can be made of the same material as the positive tab during welding. Alternatively, one of the tabs is made into a composite material plate, for example, the negative tab is made into a composite material plate having the first material and the second material, where a pure second material part of the composite material plate is encapsulated inside the battery cell unit 1, the pure first material part is a pigtail of the negative tab, and the positive tab is in the pure first material; or the positive tab is made into the composite material plate having the first material and the second material, where a pure first material part of the composite material plate is encapsulated inside the battery cell unit 1, the pure second material part is a pigtail of the positive tab, and the negative tab is in the pure second material.

When the positive tab is made of pure aluminum material and the negative tab is made of pure copper material, a thin aluminum foil may be welded (for example, ultrasonic welding) on the surface of the negative tab as a welding surface. Alternatively, a copper-aluminum composite plate is used as the negative tab, the pure copper part is encapsulated inside the battery cell unit 1, and the pure aluminum part is used as a pigtail of the negative tab, so that extension ends of the negative tab and the positive tab are the same pure aluminum material, which may facilitate laser welding.

Please continue to refer to FIG. 5, both ends of the opening 211a are provided with guide structures 211b along the width direction (Y). In this way, even for a tab 11 with a serious offset, the tab 11 can be inserted into the through groove 211 smoothly through the guide structure 211b arranged at the opening 211a. It may be understood that the guide structure 211b may be an inclined surface or a circular arc surface.

Please refer to FIG. 4, and FIG. 6 to FIG. 10, an installation structure 23 is arranged between the first harness plate 21 and the second harness plate 22, which facilitates the assembly and molding of the first harness plate 21 and the second harness plate 22.

Specifically, the installation structure 23 may at least have a buckle 231 and a buttonhole 232, where the buckle 231 is optionally arranged on the second harness plate 22, and the buttonhole 232 is arranged on the first harness plate 21. Alternatively, the buckle 231 may also be arranged on the first harness plate 21, and the buttonhole 232 is arranged on the second harness plate 22. It may be understood that the installation structure 23 may also have a pin 233 and a pin hole 234, and the installation structure 23 includes but is not limited to the above types, for example, it may also be riveted or welded. It may be further understood that the first harness plate 21 and the second harness plate 22 may be fixed only by cooperation of the buckle 231 and the buttonhole 232.

In this embodiment, an end of the first harness plate 21 in the height direction (Z) is provided with at least one buttonhole 232 and at least one pin hole 234, and the second harness plate 22 is provided with at least one buckle 231 and at least one pin 233. Structural strength and fixing stability of the first harness plate 21 and the second harness plate 22 are increased through cooperation of the buckle 231 and the buttonhole 232, and the pin 233 and the pin hole 234.

An isolation part 213 is arranged between two adjacent installation parts 212, and each isolation part 213 has a protrusion 213a. Optionally, the protrusion 213a is in a plate-like structure and extends along the height direction (Z). By providing the isolation part 213 and the protrusion 213a, the tab 11 may be prevented from being bent incorrectly during bending (wrong bending may cause a short circuit in the battery cell unit 1), and at the same time, it may avoid creepage of tabs 11 of the two adjacent installation parts 212.

Specifically, a size of the protrusion 213a is not less than a size of the electrical connector 212a along the height direction (Z), which may further ensure that creepage may not occur in the tabs 11 of the two adjacent installation parts 212.

It may be understood that the buttonhole 232 and the pin hole 234 may be arranged on the installation part 212 or the isolation part 213, and may also be arranged on the end of the first harness plate 21 in the height direction (Z) except for a part of the installation part 212 and the isolation part 213 (refer to FIG. 4). The pin hole 234 may be a cylindrical hole, or it may also be a truncated cone hole or a conical hole. It is not specifically limited in this application.

Optionally, the buttonhole 232 may be arranged on the installation part 212 or the isolation part 213. Please refer to FIG. 6, the buckle 231 has an inclination part 221a and a hook part with an inclined surface, so that the buckle 231 can be inserted into the buttonhole 232 more easily. It should be noted that, please refer to FIG. 8, when the hook part is inserted into the buttonhole 232 and faces the battery cell unit 1, interference between the hook part and the electrical connector 212a may be avoided, and arrangement of the installation part 212 may be more reasonable.

In conclusion, the through groove 211 of the first harness plate 21 provided in the embodiments of this application has an opening 211a along the height direction (Z), so that the tab 11 can pass through and be arranged on the through groove 211 through the opening 211a. Thus, by changing an assembling direction of the harness plate (namely, assembling in a direction perpendicular to an extension direction of the tab 11), the problem that the tab of the battery cell unit is not easy to be assembled with the harness plate is resolved.

The description above is only optional embodiments of this application, and is not used to limit this application. For a person skilled in the art, this application may have various modifications and changes. Any modification, equivalent replacement and improvement made within the spirit and principle of this application shall be included in the protection scope of this application.

What is claimed is:

1. A battery module, comprising:
   a plurality of battery cell units arranged along a width direction, wherein each of the battery cell units has a tab, and the tab is arranged on at least one end of the battery cell unit along a length direction; and
   a first harness plate arranged on at least one end of the battery module along the length direction, wherein the first harness plate has a plurality of through grooves, and the tab passes through and is arranged on a through groove of the plurality of through grooves;
   the through groove has an opening along a height direction, and the tab is configured to pass through and be arranged on the through groove through the opening;
   further comprising a second harness plate connected to the first harness plate, wherein the second harness plate is arranged above or below the first harness plate along the height direction;
   wherein an installation structure is arranged between the first harness plate and the second harness plate;
   the installation structure at least has a buckle and a buttonhole, and the buckle is arranged on the second harness plate, and the buttonhole is arranged on the first harness plate.

2. The battery module according to claim 1, wherein the first harness plate further comprises a plurality of installation parts, and each of the installation parts has the through grooves on both sides along the width direction; and
   each of the installation parts is provided with an electrical connector, and the tab is connected to the electrical connector.

3. The battery module according to claim 1, wherein an installation direction of the first harness plate is from bottom to top, and the second harness plate is arranged above the first harness plate along the height direction.

4. The battery module according to claim 1, further comprising a second harness plate connected to the first harness plate, wherein the second harness plate has the plurality of through grooves; and
   a through groove of the plurality of through grooves on the second harness plate is arranged correspondingly to the through groove of the plurality of through grooves on the first harness plate.

5. The battery module according to claim 4, wherein the first harness plate and the second harness plate are molded in a separate manner.

6. The battery module according to claim 4, wherein the first harness plate and the second harness plate each have a plurality of installation parts, and each of the installation parts has the through grooves on both sides along the width direction; and
   each of the installation parts is provided with an electrical connector, and the tab is connected to the electrical connector.

7. The battery module according to claim 6, wherein the electrical connector and the first harness plate or the second harness plate provided with an installation part of the plurality of installation parts are integrally formed through injection molding.

8. The battery module according to claim 6, wherein the first harness plate or the second harness plate provided with an installation part of the plurality of installation parts has a first surface facing away from the battery cell unit, and the electrical connector has a second surface facing away from the battery cell unit; and
   the second surface does not exceed the first surface along the length direction.

9. The battery module according to claim 6, wherein an isolation part is arranged between two adjacent installation parts of the plurality of installation parts, and each isolation part has a protrusion; and
   the through groove is arranged between an installation part of the two adjacent installation parts and the isolation part.

10. The battery module according to claim 9, wherein the protrusion is configured to be a plate-like structure and extend along the height direction.

11. The battery module according to claim 9, wherein a size of the protrusion is not less than a size of the electrical connector along the height direction.

12. The battery module according to claim 1, wherein an end of the first harness plate along the height direction is provided with at least one buttonhole and at least one pin hole, and the second harness plate is provided with at least one buckle and at least one pin.

13. The battery module according to claim 1, wherein the buckle has an inclination part and a hook part with an inclined surface.

14. The battery module according to claim 13, wherein the hook part is configured to face the battery cell unit when the hook part is inserted into the buttonhole.

15. The battery module according to claim 1, wherein both ends of the opening are provided with guide structures along the width direction.

16. The battery module according to claim 1, wherein the battery cell unit comprises a battery cell, a thermal conductive sheet and a heat resisting sheet, and the thermal conductive sheet is located between the battery cell and the heat resisting sheet.

17. The battery module according to claim 16, wherein in a combination of a set of arranged battery cell units, a battery cell of a next battery cell unit is bonded to a heat resisting sheet of a previous battery cell unit.

* * * * *